US012562884B2

(12) United States Patent
Weiner et al.

(10) Patent No.: US 12,562,884 B2
(45) Date of Patent: *Feb. 24, 2026

(54) OBFUSCATING DATA AT-TRANSIT

(71) Applicant: Arm Limited, Cambridge (GB)

(72) Inventors: Michael Weiner, Ness-Ziona (IL); Oded Golombek, Even Yehuda, IL (US); Harel Adani, Raanana (IL)

(73) Assignee: ARM LIMITED, Cambridge (GB)

( * ) Notice: Subject to any disclaimer, the term of this patent is extended or adjusted under 35 U.S.C. 154(b) by 297 days.

This patent is subject to a terminal disclaimer.

(21) Appl. No.: 17/950,493

(22) Filed: Sep. 22, 2022

(65) Prior Publication Data

US 2023/0018185 A1      Jan. 19, 2023

Related U.S. Application Data

(63) Continuation of application No. 16/656,388, filed on Oct. 17, 2019, now Pat. No. 11,456,855.

(51) Int. Cl.
*H04L 9/00* (2022.01)
*G06F 21/60* (2013.01)
(Continued)

(52) U.S. Cl.
CPC ............ *H04L 9/003* (2013.01); *G06F 21/606* (2013.01); *G06F 21/85* (2013.01); *G06F 7/588* (2013.01);
(Continued)

(58) Field of Classification Search
None
See application file for complete search history.

(56) References Cited

U.S. PATENT DOCUMENTS 4,009,343 A * 2/1977 Markey .............. H04B 7/18528
370/321
4,009,344 A * 2/1977 Flemming ............ H04B 7/2123
455/12.1

(Continued)

FOREIGN PATENT DOCUMENTS

WO      WO-2021129961 A1 * 7/2021

OTHER PUBLICATIONS

Cui et al "Static and Dynamic Obfuscations of Scan Data Against Scan-Based Side-Channel Attacks," IEEE Transactions on Information Forensics and Security, vol. 12, No. 2, Feb. 2017, pp. 363-376 (Year: 2017).*

(Continued)

*Primary Examiner* — Luu T Pham
*Assistant Examiner* — James J Wilcox
(74) *Attorney, Agent, or Firm* — Talem IP Law, LLP

(57) ABSTRACT

A method for obfuscating data at-transit can include receiving, at a first component on a chip, an instruction request for communicating a first data to a second component on the chip. The first component can be a processor and the second component can be an associated memory. The method can further include, determining a sequence of data arranged to obfuscate the first data while including valid bits of the first data, wherein the sequence of data indicates what is to be conveyed across lines on the chip during each time slot over a window of time controlled by a clock signal on the chip; and providing, over the window of time, the first data to the second component across the lines on the chip according to the sequence of data.

1 Claim, 6 Drawing Sheets

300

310
Receive a request for communicating data

320
Determine a sequence of data at-transit for a window of time

330
Provide the sequence for performing communications across interconnect

(51) Int. Cl.

| | | |
|---|---|---|
| *G06F 21/85* | (2013.01) | |
| *G06F 7/58* | (2006.01) | |
| *H04L 9/08* | (2006.01) | |

(52) U.S. Cl.
CPC ........ *H04L 9/0872* (2013.01); *H04L 2209/08* (2013.01); *H04L 2209/16* (2013.01)

(56) References Cited

U.S. PATENT DOCUMENTS

| | | | | |
|---|---|---|---|---|
| 4,009,345 A * | 2/1977 | Flemming | .......... | H04B 7/18519 |
| | | | | 370/327 |
| 4,009,346 A * | 2/1977 | Parker | .................. | H04Q 11/04 |
| | | | | 370/359 |
| 4,009,347 A * | 2/1977 | Flemming | .............. | H04Q 11/04 |
| | | | | 370/321 |
| 4,873,630 A * | 10/1989 | Rusterholz | .......... | G06F 9/30065 |
| | | | | 712/E9.071 |
| 5,347,648 A * | 9/1994 | Stamm | ................ | G06F 12/0831 |
| | | | | 714/763 |
| 5,404,482 A * | 4/1995 | Stamm | ................ | G06F 12/0815 |
| | | | | 711/E12.04 |
| 5,404,483 A * | 4/1995 | Stamm | ................ | G06F 12/0831 |
| | | | | 711/143 |
| 5,432,918 A * | 7/1995 | Stamm | ................. | G06F 9/3836 |
| | | | | 711/E12.024 |
| 5,619,274 A * | 4/1997 | Roop | ................... | H04N 21/435 |
| | | | | 348/E5.103 |
| 5,790,198 A * | 8/1998 | Roop | ................. | G11B 27/3054 |
| | | | | 348/E5.103 |
| 6,263,396 B1 * | 7/2001 | Cottle | .............. | H04N 21/42653 |
| | | | | 348/E5.005 |
| 7,193,994 B1 * | 3/2007 | Payson | .................... | H04L 7/02 |
| | | | | 370/380 |
| 7,304,996 B1 * | 12/2007 | Swenson | ............. | H04L 45/7453 |
| | | | | 370/231 |
| 7,539,750 B1 * | 5/2009 | Parker | .................... | G06F 15/16 |
| | | | | 709/224 |
| 7,613,209 B1 * | 11/2009 | Nguyen | .................. | H04L 69/22 |
| | | | | 370/476 |
| 9,646,516 B2 | 5/2017 | Chamley et al. | | |
| 9,749,302 B1 * | 8/2017 | Copeland | ............. | G06F 21/606 |
| 9,830,588 B2 | 11/2017 | Davis et al. | | |
| 9,836,613 B2 * | 12/2017 | Edge | ................... | H04W 64/003 |
| 9,887,969 B1 * | 2/2018 | Shemesh | ............... | H04L 9/0643 |
| 9,904,814 B2 | 2/2018 | Gonzalez | | |
| 9,967,090 B2 * | 5/2018 | Le Saint | ............... | H04L 9/0819 |
| 10,007,941 B1 * | 6/2018 | Liu | .................... | G06Q 30/0615 |
| 10,015,009 B2 * | 7/2018 | Michiels | ................ | H04L 9/004 |
| 10,020,940 B2 * | 7/2018 | Freed | ................... | H04L 9/0861 |
| 10,037,330 B1 * | 7/2018 | Burshteyn | ............. | G06F 16/122 |
| 10,044,501 B1 * | 8/2018 | Bradley | .............. | H04L 63/0492 |
| 10,110,375 B2 * | 10/2018 | Ma | ........................... | H04L 9/003 |
| 10,127,392 B1 * | 11/2018 | Anderson | ............. | G06F 21/602 |
| 10,140,612 B1 * | 11/2018 | Murray | ..................... | H04L 9/30 |
| 10,289,816 B1 * | 5/2019 | Malassenet | ......... | G06F 9/45516 |
| 10,318,762 B1 * | 6/2019 | Buckingham | ....... | G06F 21/6254 |
| 10,326,798 B2 * | 6/2019 | Lambert | .................. | H04L 63/18 |
| 10,339,837 B1 * | 7/2019 | Gounares | ............... | H04L 9/002 |
| 10,346,223 B1 * | 7/2019 | Sharifi | .................. | H04L 51/214 |
| 10,484,169 B1 * | 11/2019 | Kuroiwa | ............. | H04L 63/0428 |
| 10,496,666 B1 * | 12/2019 | Kurtic | ................. | G06F 16/254 |
| 10,509,918 B1 * | 12/2019 | Cho | ........................ | G06F 21/14 |
| 10,523,433 B1 * | 12/2019 | Monahan | ............... | H04L 9/088 |
| 10,678,707 B2 | 6/2020 | Poeppelmann et al. | | |
| 10,685,096 B2 * | 6/2020 | Schepers | ................ | G06F 21/14 |
| 10,721,213 B1 * | 7/2020 | Hagelstrom | ........ | H04L 63/1441 |
| 10,733,325 B1 * | 8/2020 | Goodsitt | ............ | G06F 21/6263 |
| 10,824,897 B1 * | 11/2020 | Cao | .................... | G06F 18/24147 |
| 10,936,738 B1 * | 3/2021 | Roberts | .............. | H04L 63/0428 |
| 11,139,971 B2 | 10/2021 | Poeppelmann | | |
| 11,265,163 B2 | 3/2022 | Poeppelmann | | |
| 11,516,109 B1 * | 11/2022 | White | ..................... | H04L 67/61 |
| 11,531,767 B1 * | 12/2022 | Szanto | ................. | G06F 21/6209 |

| | | | | |
|---|---|---|---|---|
| 2001/0014976 A1 * | 8/2001 | Roop | .................... | H04N 7/088 |
| | | | | 348/E7.063 |
| 2002/0108063 A1 | 8/2002 | Lee et al. | | |
| 2002/0152209 A1 | 10/2002 | Merugu et al. | | |
| 2003/0007513 A1 * | 1/2003 | Barker | ...................... | H04J 3/22 |
| | | | | 370/476 |
| 2005/0138054 A1 * | 6/2005 | Godwin | ............. | H04L 67/1097 |
| 2006/0041722 A1 * | 2/2006 | Hakura | ............... | G06F 12/0862 |
| | | | | 711/120 |
| 2006/0061795 A1 * | 3/2006 | Walmsley | ............... | G06F 21/73 |
| | | | | 358/1.14 |
| 2006/0067592 A1 * | 3/2006 | Walmsley | ........... | G06K 15/102 |
| | | | | 382/303 |
| 2006/0072952 A1 * | 4/2006 | Walmsley | ........... | G06K 15/102 |
| | | | | 400/62 |
| 2006/0087525 A1 * | 4/2006 | Jackson Pulver | .... | B41J 2/04573 |
| | | | | 347/12 |
| 2006/0092205 A1 * | 5/2006 | Jackson Pulver | .... | B41J 2/04573 |
| | | | | 347/42 |
| 2006/0092222 A1 * | 5/2006 | Jackson Pulver | ........ | B41J 2/155 |
| | | | | 347/43 |
| 2006/0098042 A1 * | 5/2006 | Silverbrook | ............. | B41J 2/145 |
| | | | | 347/40 |
| 2006/0098044 A1 * | 5/2006 | Jackson Pulver | .... | B41J 2/04541 |
| | | | | 347/43 |
| 2006/0125854 A1 * | 6/2006 | Jackson Pulver | .... | B41J 2/04573 |
| | | | | 347/9 |
| 2006/0125855 A1 * | 6/2006 | Silverbrook | ......... | G06K 15/102 |
| | | | | 347/9 |
| 2006/0125857 A1 * | 6/2006 | Silverbrook | ........... | B41J 2/2135 |
| | | | | 347/12 |
| 2006/0125858 A1 * | 6/2006 | Silverbrook | ........... | B41J 2/2139 |
| | | | | 347/12 |
| 2006/0125859 A1 * | 6/2006 | Walmsley | ........... | B41J 2/04573 |
| | | | | 347/12 |
| 2006/0125861 A1 * | 6/2006 | Silverbrook | ......... | B41J 2/04541 |
| | | | | 347/42 |
| 2006/0125863 A1 * | 6/2006 | Silverbrook | ........... | B41J 2/0451 |
| | | | | 347/14 |
| 2006/0125876 A1 * | 6/2006 | Walmsley | ................ | B41J 2/145 |
| | | | | 347/40 |
| 2006/0129806 A1 * | 6/2006 | Walmsley | ........... | B41J 2/17546 |
| | | | | 713/161 |
| 2006/0132512 A1 * | 6/2006 | Walmsley | ........... | B41J 2/04551 |
| | | | | 347/5 |
| 2006/0132516 A1 * | 6/2006 | Walmsley | ........... | B41J 2/04541 |
| | | | | 347/9 |
| 2006/0132518 A1 * | 6/2006 | Jackson Pulver | .... | B41J 2/04543 |
| | | | | 347/12 |
| 2006/0132521 A1 * | 6/2006 | Walmsley | ........... | B41J 2/04543 |
| | | | | 347/14 |
| 2006/0132525 A1 * | 6/2006 | Walmsley | ............. | B41J 2/2135 |
| | | | | 347/19 |
| 2006/0132822 A1 * | 6/2006 | Walmsley | ................ | G06F 21/72 |
| | | | | 358/1.14 |
| 2006/0136725 A1 * | 6/2006 | Walmsley | ............. | H04L 9/3247 |
| | | | | 713/171 |
| 2006/0139380 A1 * | 6/2006 | Walmsley | ........... | B41J 2/04573 |
| | | | | 347/5 |
| 2006/0139386 A1 * | 6/2006 | Silverbrook | ........... | B41J 2/2139 |
| | | | | 347/12 |
| 2006/0139387 A1 * | 6/2006 | Silverbrook | ........... | G06K 15/102 |
| | | | | 347/42 |
| 2006/0139388 A1 * | 6/2006 | Silverbrook | ........... | B41J 2/2146 |
| | | | | 347/42 |
| 2006/0139681 A1 * | 6/2006 | Walmsley | ........... | G06F 21/606 |
| | | | | 358/1.14 |
| 2006/0143454 A1 * | 6/2006 | Walmsley | ............. | G06F 21/85 |
| | | | | 713/170 |
| 2006/0164451 A1 * | 7/2006 | Pulver | .................. | B41J 2/04573 |
| | | | | 347/12 |
| 2006/0164452 A1 * | 7/2006 | Walmsley | ........... | B41J 2/04591 |
| | | | | 347/12 |
| 2006/0164453 A1 * | 7/2006 | Silverbrook | ............. | B41J 2/155 |
| | | | | 347/42 |

(56) References Cited

U.S. PATENT DOCUMENTS

| | | | |
|---|---|---|---|
| 2006/0164454 A1* | 7/2006 | Walmsley | G06K 15/1857 347/14 |
| 2006/0164455 A1* | 7/2006 | Silverbrook | B41J 2/0458 347/14 |
| 2006/0164462 A1* | 7/2006 | Silverbrook | B41J 2/155 347/14 |
| 2006/0181558 A1* | 8/2006 | Walmsley | B41J 2/04541 347/12 |
| 2006/0187251 A1* | 8/2006 | Pulver | B41J 2/04505 347/42 |
| 2006/0200672 A1* | 9/2006 | Calhoon | H04L 9/3278 713/176 |
| 2006/0274112 A1* | 12/2006 | Jackson Pulver | B41J 2/2139 347/42 |
| 2006/0294312 A1* | 12/2006 | Walmsley | H04L 9/3215 711/122 |
| 2007/0019016 A1* | 1/2007 | Silverbrook | G06K 15/102 347/13 |
| 2007/0083491 A1* | 4/2007 | Walmsley | G06F 21/608 |
| 2007/0186082 A1* | 8/2007 | Prokopenko | G06F 9/3885 712/221 |
| 2008/0005024 A1* | 1/2008 | Kirkwood | G06Q 10/00 705/50 |
| 2009/0182965 A1* | 7/2009 | Norman | G11C 7/24 711/163 |
| 2010/0299538 A1 | 11/2010 | Miller | |
| 2011/0219208 A1* | 9/2011 | Asaad | G06F 9/06 712/12 |
| 2013/0132607 A1 | 5/2013 | Sinha et al. | |
| 2013/0151842 A1* | 6/2013 | Yu | H04L 9/003 713/150 |
| 2013/0346336 A1* | 12/2013 | Murphy | G06Q 10/08 705/333 |
| 2014/0074719 A1* | 3/2014 | Gressel | G06Q 30/06 713/168 |
| 2014/0143883 A1* | 5/2014 | Shen-Orr | H04L 9/003 726/26 |
| 2014/0192583 A1* | 7/2014 | Rajan | G11C 7/10 365/63 |
| 2014/0223170 A1* | 8/2014 | Reynolds | H04L 63/04 713/153 |
| 2014/0247942 A1* | 9/2014 | Tuttle | H04W 12/033 380/270 |
| 2015/0012737 A1 | 1/2015 | Newell | |
| 2015/0220431 A1 | 8/2015 | Rolandi et al. | |
| 2015/0270952 A1* | 9/2015 | Sethumadhavan | H04L 9/008 713/182 |
| 2015/0271677 A1 | 9/2015 | Van Nieuwenhuyze et al. | |
| 2016/0171252 A1* | 6/2016 | Leiserson | G09C 1/00 713/193 |
| 2017/0006057 A1* | 1/2017 | Perez Lafuente | H04L 67/34 |
| 2017/0012952 A1* | 1/2017 | Cocchi | H04L 63/062 |
| 2017/0024585 A1* | 1/2017 | Mooij | G06F 21/72 |
| 2017/0026342 A1* | 1/2017 | Sidana | H04L 9/008 |
| 2017/0033934 A1* | 2/2017 | Camenisch | H04L 9/3263 |
| 2017/0054554 A1* | 2/2017 | Park | H04L 9/088 |
| 2017/0061138 A1* | 3/2017 | Lambert | H04L 63/18 |
| 2017/0063548 A1* | 3/2017 | Naccache | G06F 21/77 |
| 2017/0091485 A1* | 3/2017 | Yuen | H04L 9/002 |
| 2017/0098089 A1* | 4/2017 | Stewart | G06F 21/602 |
| 2017/0109539 A1* | 4/2017 | Kinasz | G06F 21/629 |
| 2017/0116438 A1* | 4/2017 | Ekberg | H04L 63/0876 |
| 2017/0126398 A1* | 5/2017 | Wiener | H04L 9/0631 |
| 2017/0155502 A1 | 6/2017 | Yanamandra et al. | |
| 2017/0171170 A1* | 6/2017 | Sun | H04L 9/088 |
| 2017/0171746 A1* | 6/2017 | Haase | H04L 9/10 |
| 2017/0177504 A1* | 6/2017 | Desai | G06F 12/1408 |
| 2017/0177890 A1* | 6/2017 | Fink | G06F 7/588 |
| 2017/0178046 A1* | 6/2017 | Chakraborty | G06Q 10/06393 |
| 2017/0199993 A1* | 7/2017 | Minamikawa | G06F 21/16 |
| 2017/0220320 A1* | 8/2017 | Marin | G06F 7/523 |
| 2017/0241760 A1* | 8/2017 | Roth | G01B 5/0016 |
| 2017/0257219 A1* | 9/2017 | Yi | G06F 9/45516 |
| 2017/0272414 A1* | 9/2017 | Sadhasivan | G09C 1/00 |
| 2017/0289237 A1* | 10/2017 | Feltham | G06F 16/1827 |
| 2017/0316214 A1* | 11/2017 | El Defrawy | G06F 21/60 |
| 2017/0316216 A1* | 11/2017 | Kim | H04L 63/0428 |
| 2017/0324543 A1* | 11/2017 | Drexler | H04L 9/002 |
| 2017/0324544 A1* | 11/2017 | Marin | H04L 9/002 |
| 2017/0324546 A1* | 11/2017 | Marin | H04L 9/3033 |
| 2017/0331796 A1* | 11/2017 | Crofton | H04L 67/1095 |
| 2017/0353294 A1* | 12/2017 | Marin | H04L 9/002 |
| 2017/0353302 A1* | 12/2017 | Fernandez | H04L 9/14 |
| 2017/0357815 A1* | 12/2017 | Malka | G06F 21/101 |
| 2017/0359279 A1* | 12/2017 | Peterson | H04W 4/12 |
| 2017/0364687 A1* | 12/2017 | Malka | G06F 21/602 |
| 2017/0364705 A1* | 12/2017 | Villars | G06F 21/6227 |
| 2017/0364710 A1* | 12/2017 | Sandhu | H04L 9/003 |
| 2017/0366514 A1* | 12/2017 | Malka | H04L 9/3247 |
| 2017/0373828 A1* | 12/2017 | Michiels | G06F 21/75 |
| 2018/0007017 A1* | 1/2018 | Chacko | G06F 11/362 |
| 2018/0013736 A1* | 1/2018 | Michiels | H04L 9/003 |
| 2018/0034847 A1* | 2/2018 | Stella | H04L 63/1408 |
| 2018/0048459 A1* | 2/2018 | Ding | G06F 21/575 |
| 2018/0060561 A1* | 3/2018 | Pedersen | G06F 21/44 |
| 2018/0060612 A1* | 3/2018 | Gladwin | G06F 21/85 |
| 2018/0062843 A1* | 3/2018 | Gopal | G06F 7/725 |
| 2018/0063080 A1* | 3/2018 | Lehmann | H04L 41/28 |
| 2018/0081818 A1* | 3/2018 | Che | G06F 12/0897 |
| 2018/0081825 A1* | 3/2018 | Aschauer | G06F 12/1408 |
| 2018/0081826 A1* | 3/2018 | Gounares | G06F 21/14 |
| 2018/0096166 A1* | 4/2018 | Rogers | G06F 16/951 |
| 2018/0097612 A1* | 4/2018 | Cheng | H04L 9/003 |
| 2018/0121369 A1 | 5/2018 | Poeppelmann et al. | |
| 2018/0123794 A1* | 5/2018 | Goranov | H04L 9/30 |
| 2018/0129476 A1* | 5/2018 | Wesson | G06F 7/582 |
| 2018/0137272 A1* | 5/2018 | Kamal | H04W 4/80 |
| 2018/0137310 A1* | 5/2018 | Schenk | G06F 21/71 |
| 2018/0137512 A1* | 5/2018 | Georgiadis | H04L 63/08 |
| 2018/0139049 A1* | 5/2018 | Goranov | H04L 9/3247 |
| 2018/0139184 A1* | 5/2018 | Andersson | H04L 9/0838 |
| 2018/0167197 A1* | 6/2018 | Anderson | H04L 9/002 |
| 2018/0173199 A1* | 6/2018 | Kim | G06Q 50/184 |
| 2018/0181947 A1* | 6/2018 | Roberts | G06Q 20/3227 |
| 2018/0205543 A1* | 7/2018 | Fradet | H04L 9/3234 |
| 2018/0219680 A1* | 8/2018 | Kamal | G06F 21/53 |
| 2018/0225466 A1* | 8/2018 | Ducatel | H04L 9/3247 |
| 2018/0241552 A1* | 8/2018 | Kurian | H04L 9/0852 |
| 2018/0241760 A1 | 8/2018 | Stephens | |
| 2018/0276393 A1* | 9/2018 | Allen | G06F 21/602 |
| 2018/0276394 A1* | 9/2018 | Nair | G06F 21/575 |
| 2018/0301426 A1* | 10/2018 | Savidis | H04L 9/3278 |
| 2018/0309568 A1* | 10/2018 | Bauer | H04L 9/0625 |
| 2018/0309577 A1* | 10/2018 | Newcombe | H04L 63/083 |
| 2018/0336209 A1* | 11/2018 | Burshteyn | H04L 9/0631 |
| 2018/0343119 A1* | 11/2018 | Chen | H04L 9/14 |
| 2018/0349575 A1* | 12/2018 | Somsikov | G06F 21/14 |
| 2018/0349577 A1* | 12/2018 | Goldwasser | H04L 9/3073 |
| 2018/0349631 A1 | 12/2018 | Illendula et al. | |
| 2018/0351914 A1* | 12/2018 | Jobson | H04L 63/0245 |
| 2018/0367509 A1* | 12/2018 | O'Hare | H04L 69/14 |
| 2018/0373885 A1* | 12/2018 | Arad | G06F 21/629 |
| 2018/0375839 A1* | 12/2018 | Dattolo | H04W 12/041 |
| 2018/0375841 A1* | 12/2018 | Tola | H04L 63/0421 |
| 2019/0018936 A1* | 1/2019 | Zhou | H04L 9/3239 |
| 2019/0034660 A1* | 1/2019 | Ford | G06F 21/552 |
| 2019/0042711 A1* | 2/2019 | Parhi | H04L 9/0825 |
| 2019/0044719 A1 | 2/2019 | Poeppelmann | |
| 2019/0095629 A1* | 3/2019 | Lee | G06F 21/602 |
| 2019/0102574 A1* | 4/2019 | Roberts | G06N 5/022 |
| 2019/0108366 A1* | 4/2019 | Resch | H04N 21/8456 |
| 2019/0140835 A1* | 5/2019 | Moen | G06F 21/577 |
| 2019/0141414 A1* | 5/2019 | Goodes | H04N 21/25833 |
| 2019/0188157 A1* | 6/2019 | Shamsaasef | G06F 9/544 |
| 2019/0199694 A1* | 6/2019 | Albert | G06F 21/12 |
| 2019/0205568 A1* | 7/2019 | Veugen | H04L 9/008 |
| 2019/0220608 A1* | 7/2019 | Mathrubootham | G06F 21/31 |
| 2019/0227802 A1* | 7/2019 | Kessler | G06F 9/3848 |
| 2019/0227986 A1* | 7/2019 | Burshteyn | G06F 16/122 |
| 2019/0228165 A1* | 7/2019 | Mcmillan | H04L 9/3226 |
| 2019/0229886 A1* | 7/2019 | Gouget | H04L 9/0618 |
| 2019/0238524 A1* | 8/2019 | Copty | H04L 9/083 |

(56) References Cited

U.S. PATENT DOCUMENTS

| | | | | |
|---|---|---|---|---|
| 2019/0272153 A1* | 9/2019 | Hollmann | | G06F 7/729 |
| 2019/0272162 A1* | 9/2019 | Couillard | | G06F 21/125 |
| 2019/0303349 A1* | 10/2019 | Burshteyn | | H04L 9/0891 |
| 2019/0303562 A1* | 10/2019 | Masputra | | G06F 12/084 |
| 2019/0305927 A1* | 10/2019 | Bhunia | | G06F 21/76 |
| 2019/0305930 A1* | 10/2019 | Bauer | | H04L 9/0631 |
| 2019/0306134 A1* | 10/2019 | Shanbhogue | | G06F 21/64 |
| 2019/0312728 A1 | 10/2019 | Poeppelmann | | |
| 2019/0342090 A1* | 11/2019 | Pisasale | | H04L 9/0894 |
| 2019/0354716 A1* | 11/2019 | Basava | | G06F 16/2379 |
| 2019/0363883 A1* | 11/2019 | Rao | | H04L 9/14 |
| 2019/0371209 A1* | 12/2019 | Gounares | | G06F 8/52 |
| 2019/0372771 A1* | 12/2019 | Wagner | | H04L 9/3231 |
| 2019/0377893 A1* | 12/2019 | Ciziunas | | H04L 63/1491 |
| 2020/0034565 A1* | 1/2020 | Kim | | G06N 20/20 |
| 2020/0034573 A1* | 1/2020 | Pulkus | | G06F 21/755 |
| 2020/0042677 A1* | 2/2020 | Zwanzger | | G06F 21/54 |
| 2020/0051161 A1* | 2/2020 | Dylla | | G06F 21/6245 |
| 2020/0053560 A1* | 2/2020 | Lopez | | G06F 9/455 |
| 2020/0076779 A1* | 3/2020 | Noble | | H04L 9/0861 |
| 2020/0104891 A1 | 4/2020 | Rule et al. | | |
| 2020/0112424 A1* | 4/2020 | Gouget | | H04L 9/002 |
| 2020/0117795 A1* | 4/2020 | Sasson | | H04L 9/3278 |
| 2020/0120083 A1* | 4/2020 | Kaladgi | | G06F 21/604 |
| 2020/0177605 A1* | 6/2020 | Hsiung | | H04L 9/065 |
| 2020/0265159 A1* | 8/2020 | Schmatz | | H04L 9/008 |
| 2020/0266970 A1* | 8/2020 | Rietman | | G06F 7/764 |
| 2020/0279269 A1* | 9/2020 | Wagner | | G06Q 20/3829 |
| 2020/0311306 A1* | 10/2020 | Kim | | G09C 5/00 |
| 2020/0311678 A1* | 10/2020 | Fletcher | | G06Q 20/3829 |
| 2020/0313850 A1* | 10/2020 | Lin | | H04L 9/0861 |
| 2020/0319925 A1 | 10/2020 | Clampitt, III et al. | | |
| 2020/0336303 A1 | 10/2020 | Sierra et al. | | |
| 2020/0358925 A1* | 11/2020 | Hall | | H04N 7/181 |
| 2020/0394287 A1* | 12/2020 | Mucciolo | | H04L 9/06 |
| 2021/0021420 A1* | 1/2021 | Hassan | | H04L 63/083 |
| 2021/0034724 A1* | 2/2021 | Fong | | G06V 40/25 |
| 2021/0073041 A1* | 3/2021 | Cheng | | G06N 20/00 |
| 2021/0075775 A1* | 3/2021 | Cheng | | H04L 63/0428 |
| 2021/0097154 A1* | 4/2021 | Mawdsley | | G06F 21/14 |
| 2021/0119763 A1* | 4/2021 | Weiner | | G06F 21/606 |
| 2021/0319142 A1* | 10/2021 | Kärkkäinen | | H04L 9/0891 |
| 2021/0320795 A1* | 10/2021 | Murdoch | | G06F 21/6209 |
| 2021/0326413 A1* | 10/2021 | Mallon | | G06F 21/14 |
| 2021/0352049 A1* | 11/2021 | Aabye | | H04L 9/0866 |
| 2022/0263646 A1* | 8/2022 | Kim | | G06F 3/0659 |
| 2022/0350960 A1* | 11/2022 | Heller | | G06F 40/174 |
| 2022/0382969 A1* | 12/2022 | Heller | | G06F 40/131 |
| 2022/0417218 A1* | 12/2022 | Purta | | H04L 63/0414 |
| 2023/0035344 A1* | 2/2023 | White | | G06F 16/2322 |
| 2023/0062354 A1* | 3/2023 | White | | G06F 16/278 |

OTHER PUBLICATIONS

Nguyen et al "XNoC: A Non-intrusive TDM Circuit-Switched Network-on-Chip," IEEE, 2016, pp. 1-11 (Year: 2016).*

Kessner "Design of a Time-Slot-Interchanger and Other TDM bus Interfacing Issues," IEEE, pp. 515-521 (Year: 1998).*

Amalarethinam et al "Data Security Enhancement in Public Storage Using Data Obfuscation & Steganography," World Congress on Computing and Communication Technologies, (WCCCT), pp. 181-184 (Year: 2017).*

Spreitzer et al "Systematic Classification of Side-Channel Attacks: A Case Study for Mobile Devices," IEEE Communications Surveys & Tutorials, pp. 1-24 (Year: 2017).*

Awad et al "ObfusMem: A Low-Overhead Access Obfuscation for Trusted Memories," ISCA '17, Jun. 24-28, Toronto, ON, Canada, ASM, pp. 107-119, (Year: 2017).*

Dunaev et al "Aspects of Intermediate Level Obfuscation," 2013 Third Eastern European Regional Conference on the Engineering of Computer Based Systems, IEEE Computer Society, pp. 138-142 (Year: 2013).*

Zhang "A Practical Logic Obfuscation Technique for Hardware Security," IEEE Transactions on Very Large Scale Integration (VLSI) Systems, vol. 24, No. 3, IEEE, pp. 1-5 (Year: 2015).*

Tang et al "Side-Channel Attacks in a Real Scenario," pp. 586-598 (Year: 2018).*

Lemke-Rust et al "Exploring Embedded Software with Side Channels and Fault Analysis," pp. 1-4 (Year: 2018).*

Non-Final Office Action issued in U.S. Appl. No. 16/656,388, mailed Dec. 14, 2020, 23 pages.

Zhao Pan et al. "Obfuscation Algorithm Design Based on Fully Homomorphism" IEEE, 2018, pp. 1-3.

Sijie Xiong et al. "Defending Against Packet-Size Side-Channel Attacks in IOT Networks" ICASSP 2018, 2018, 5 pages.

Final Office Action issued in U.S. Appl. No. 16/656,388, mailed Jun. 24, 2021, 24 pages.

Non-Final Office Action issued in U.S. Appl. No. 16/656,388, mailed Oct. 5, 2021, 25 pages.

Yannick Sierra et al., U.S. Appl. No. 62/564,947, 2017, 57 pages.

Advisory Action issued in U.S. Appl. No. 16/656,388, mailed Apr. 29, 2022, 10 pages.

Awad et al. "ObfusMem: A Low-Overhead Access Obfuscation for Trusted Memories" ACM, 2017, pp. 107-119.

Iang Wang et al. "Seeing through Network-Protocol Obfuscation" ACM, 2015, pp. 1-13.

Notice of Allowance issued in U.S. Appl. No. 16/656,388, mailed May 25, 2022, 20 pages.

Lucas Dixon et al. "Network Traffic Obfuscation and Automated Internet Censorship" Nov. 14, 2016, pp. 1-9.

Daniele Riboni et al. "Obfuscation of Sensitive Data in Network Flows" IEEE INFOCOM, Mar. 2012, pp. 1-10.

* cited by examiner

OBFUSCATING DATA AT-TRANSIT

BACKGROUND

Tampering, or hacking, of an electronic system can give unauthorized users access to sensitive information. An example of such sensitive information can be secret key information used in cryptography engine implementations, such as AES (Advanced Encryption Standard). An attacker can use characteristics of the electronic system to passively or actively gain knowledge about system operations. Sometimes adversaries attempt to observe the behavior of the circuit to determine sensitive data.

By observing electromagnetic radiation emitted when bits are transmitted to and from memory (or between other components), values of the bits being conveyed across lines on the chip may be identified. Similarly, an adversary may use power analysis and correlate power usage with the sensitive data. For example, differential power analysis, which is a statistical method for analyzing power consumption, may be used to identify data-dependent correlations. For differential power analysis, multiple traces of two sets of data are obtained, and the difference of the average of these traces is computed. If the difference is close to zero, then the two sets are considered not correlated. If the two sets are correlated, then the difference will be a non-zero number and given enough traces, even tiny correlations can be seen, regardless of how much noise is in the system.

BRIEF SUMMARY

Methods and systems for obfuscating data at-transit within an electronic system are provided. The described methods and systems can be suitable for protecting against attacks, such as side channel attacks including electromagnetic radiation analysis and power analysis.

The protection can involve adding more difficulty or complexity to a system to hinder an attacker from being able to trace or analyze the activity occurring within the electronic system. By obfuscating the data at-transit, an attacker cannot gain system knowledge by active probing (e.g., tapping a signal line or power line) or remote side-channel analysis (e.g., noticing power differences and electromagnetic (EM) differences).

A method for obfuscating data at-transit can include receiving, at a first component on a chip, an instruction request for communicating a first data to a second component on the chip; determining a sequence of data arranged to obfuscate the first data while including valid bits of the first data, wherein the sequence of data indicates what is to be conveyed across lines on the chip during each time slot over a window of time controlled by a clock signal on the chip, wherein the window of time is an amount of time given for the second component to receive the first data; and providing, over the window of time, the first data to the second component across the lines on the chip according to the sequence of data.

When applying the method during reading from or writing to memory, the method for obfuscating data at-transit can begin upon receiving an instruction request for memory access. The obfuscation method can determine a sequence of data at-transit for a window of time. The sequence can include an indication for valid data and an indication for dummy data. When the request for memory access is a request to obtain data stored in the memory, memory requests can be performed according to the determined sequence of data at-transit. The source of the request can then be provided with the valid data and the dummy data can be discarded.

The described method can be performed within a secure element of an electronic system. The secure element can include a processor coupled to receive data input and a clock signal and output requests; a memory coupled to receive requests from the processor and return data to the processor; an interconnect fabric coupling the processor and the memory; and an obfuscation engine coupled to the processor and memory to receive a valid request and output obfuscated data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2A is an example implementation where the obfuscation engine is part of the processor. FIG. 2B is an example implementation where the obfuscation engine is part of the memory system. FIG. 2C is an example implementation where the obfuscation engine is an independent element.

DETAILED DESCRIPTION

Methods and systems for obfuscating data at-transit within an electronic system are provided. The described methods and systems can be suitable for protecting against attacks, such as side-channel attacks including electromagnetic radiation analysis and power analysis.

In side-channel attacks, an adversary can gain information about a system without tampering with the system. This can occur by an adversary scanning the unintentional outputs of the hardware. For example, the power signature of a system can be significantly stronger when accessing memory than when performing other operations. The stronger power signature can be traced more clearly from the outside. Additionally, since these types of attacks lack the ability to determine context, the attacks often rely on the secure element transmitting as much valid data as possible. By diluting the amount of valid data in various ways, the data an adversary does manage to collect can become progressively less useful.

The methods described herein can obscure data at transit such that an attacker cannot easily gain system knowledge by active probing (e.g., tapping a signal line or power line) or remote side-channel analysis (e.g., noticing power differences and EM differences).

An obfuscation system for obscuring data at transit can be incorporated into an electronic system as part of an existing component or as an independent component that performs obfuscation methods on behalf of an existing component.

The application of the described obfuscation systems and methods can be based on areas and communications that may pose the most risk of attack. For example, communications between components such as between a crypto engine and a processor and between the crypto engine or processor and a memory storage may take place over connections such as buses, relays, fabric, interconnects, opto-electronic channels and the like. Many electronic systems are deterministic in nature. That is, the resulting behavior of the system is determined by its initial state and inputs and is not random. Accordingly, it can be beneficial to inject some degree of randomness to a deterministic system to cause indeterministic behavior. There are several ways to inject randomness to the system, including obfuscating the data at-transit. Methods for obscuring data at-transit can be initiated upon introducing data to anything that is functionally and intuitively deterministic within the system, such as relays or memory. Accordingly, the described systems and methods may provide certain countermeasures against attacks.

Figure 1:
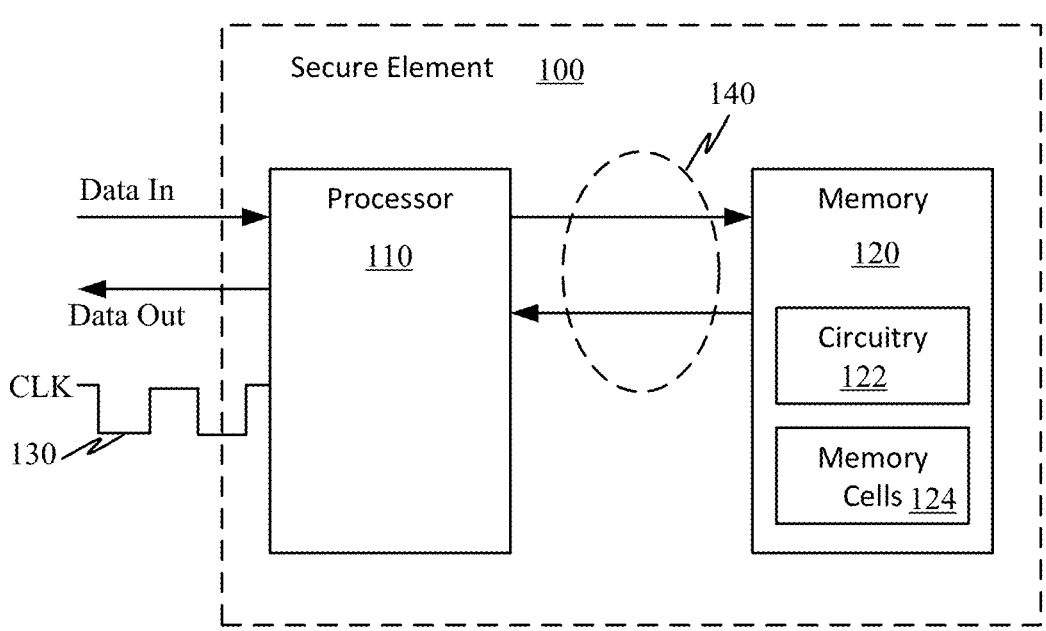
FIG. 1 shows an example secure element in which methods of obfuscating data at-transit can be implemented.

FIG. 1 shows an example secure element in which methods of obfuscating data at-transit can be implemented. Referring to FIG. 1, a secure element 100 can include a processor 110 and a memory 120. The processor 110 may be a microprocessor with circuitry such as a control unit, input/output units, arithmetic logic unit, registers and cache. In some cases, the processor 110 can include state machines and other components. The processor 110 can receive data input (Data In) and a clock signal (CLK 130) from outside the secure element 100, communicate with the memory 120 to read and write data, and output data output (Data Out). The clock signal 130 can be used by the processor 110 to control the timing of the operations performed by the secure element 100. Requests to read from and/or write to the memory 120 can include a memory address along with other bits that may be understandable by the memory 120. Data can traverse between the processor 110 and memory 120 via a fabric 140, which may include, for example, hardware relays (e.g., hardware relay network), buses (e.g., data bus) and interconnects. Other types of fabrics include wires (metal lines) and vias.

The memory 120 can include circuitry 122 and memory cells 124. The circuitry 122 can support the addressing of the memory cells 124 and other mechanisms to write and read the data stored in the cells 124. Memory 120 may be any suitable memory type including, but not limited to volatile memories (e.g., random access memory such as DRAM and SRAM) and non-volatile memories (e.g., read only memory such as EEPROM and flash and magnetic memory such as FeRAM and MRAM). In some cases, more than one memory is included and provide volatile and non-volatile storage for the secure element 100.

An obfuscation system can be used within a secure element such as secure element 100 in an electronic system to perform methods of obfuscation for obfuscating data at-transit (e.g., between processor 110 and memory 120). The obfuscation system can further de-obfuscate the data upon completion of secure operations within the secure element in order to enable the electronic system to operate appropriately. In some cases, the obfuscation system may be implemented as control logic using existing hardware within the secure element. In other cases, the obfuscation system may be implemented in software using existing hardware in the secure element.

The obfuscation system can be considered an "obfuscation engine" as its use can be integral for other programs and functions of the electronic system (and secure element). Accordingly, obfuscation system and obfuscation engine are used interchangeably herein.

Figure 2A:
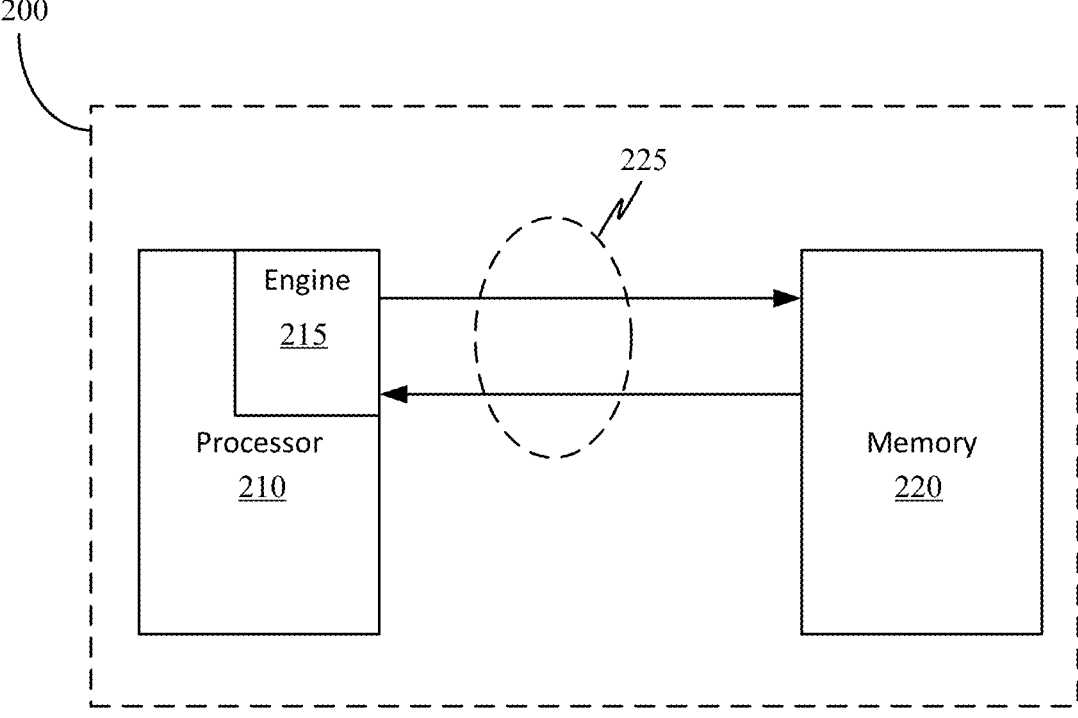
FIGS. 2A-2C show example illustrations of a secure element in an electronic system using an obfuscation engine.
Figure 2B:
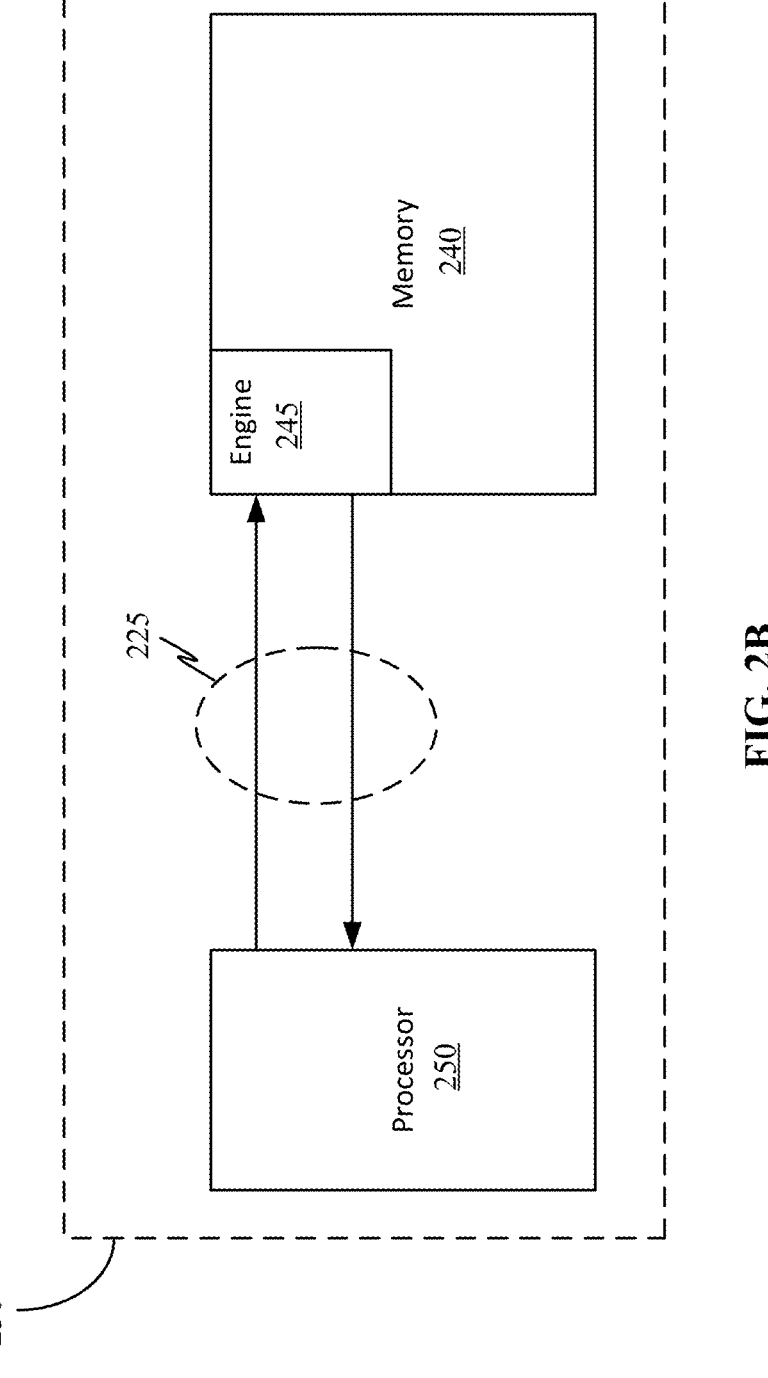
Figure 2C:
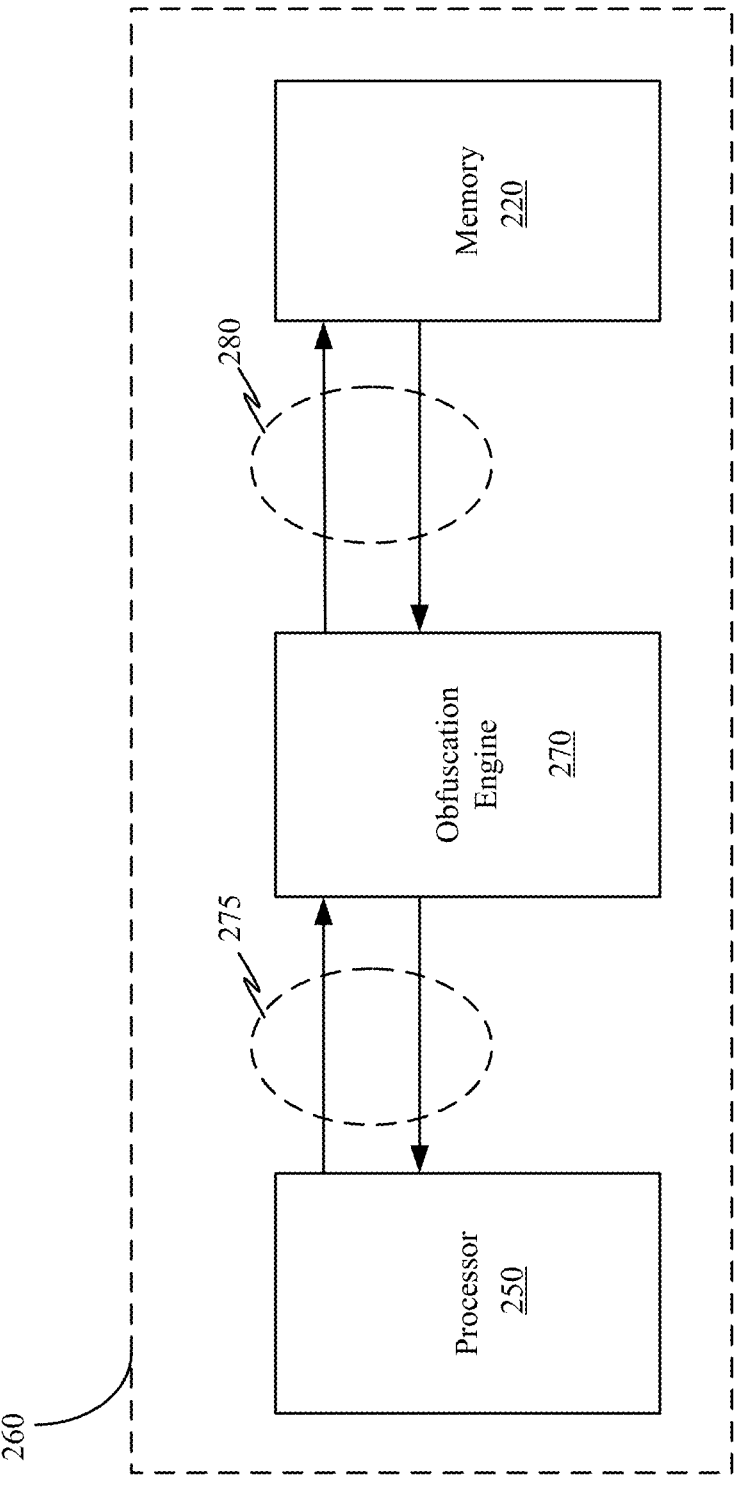

FIGS. 2A-2C show example illustrations of a secure element in an electronic system using an obfuscation engine. FIG. 2A is an example implementation where the obfuscation engine is part of the processor. FIG. 2B is an example implementation where the obfuscation engine is part of the memory system. FIG. 2C is an example implementation where the obfuscation engine is an independent element. In each of the three example implementations, the obfuscation engine can perform the process shown in FIG. 3 to obfuscate data at-transit between a processor and a memory.

Referring to FIG. 2A, a secure element 200 can have a processor 210 with an obfuscation engine 215. The obfuscation engine 215 can obfuscate data on behalf of the processor 210 such that data transmitted and received during requests to memory 220 can be obfuscated.

In some cases, such as a read request, the obfuscation engine may obfuscate the data in-transit by sending valid read requests and dummy read requests. In some of such cases, the memory 220 can operate as usual and respond with data as if all requests are valid and the obfuscation engine 215 discards the data provided in response to the dummy read requests. In some cases, dummy requests are to addresses with valid data. In some cases, dummy requests are to addresses with data specifically stored as dummy data in the memory 220.

In some cases, such as during a write request (and even for a read request), the obfuscation engine 215 applies an indicator to the data to indicate whether the data is valid data or dummy data (or whether the request itself is a valid request or a dummy request). In some of such cases, the memory 220 understands to discard/not write data to addresses indicated as part of a dummy write request. The indicator may be a flag or other marker that can be understood to indicate the type of data. Such flags and markers may already be part of an existing protocol used in the secure element (e.g., an available bit in the register, page table, or other data structure used to indicate permissions with respect to a memory location or address or an available bit in the transmission protocol for communication over the interconnect).

In some cases where null data is provided, the request can include no data or incomplete data, or a delay can be inserted between valid and/or dummy requests.

In this manner, valid data transiting from the processor 210 to the memory 220 and from the memory 220 to the processor 210 over interconnect 225 is harder to detect.

Referring to FIG. 2B, a secure element 230 can have a memory 240 with an obfuscation engine 245. The obfuscation engine 245 can obfuscate data on behalf of the memory 240 such that data transmitted in response to requests to memory 240 from a processor 250 can be obfuscated.

In some cases, such as a read request from processor 250, the obfuscation engine 245 may obfuscate the data in-transit by sending valid data, dummy data, and/or null data in response to the read request. The obfuscation engine 245 can include an indicator with the data being sent in response to the read request such that the processor 250 can determine whether to discard or use the returned data. In some cases, such as during a write request, the obfuscation engine 245 can cause dummy data to be transmitted to the processor 250. As mentioned above, the indicator may be a flag or other marker that can be understood to indicate the type of data.

The obfuscation engine 245 can, in some cases, also modify the data width of the data transmitted to the processor 250 such that extra bits or bytes are transmitted in response to a read request from the processor 250. These extra bits or bytes can be discarded by the processor 250. In some cases, the extra bits are provided before the valid data. In some cases, the extra bits are provided at the end of the valid data. In some cases, extra bits are provided interspersed between valid data in a manner that can be easily identified by the processor 250 (e.g., by a pattern understood by the processor 250 because the processor 250 expects the data in that manner or by a pattern provided to the processor 250 from the obfuscation engine 245 in a message before the data is sent as some examples).

Accordingly, the obfuscation engine can send more and different data to the processor 250 over interconnect 225 in a manner that makes detection of valid information harder to detect.

Referring to FIG. 2C, a secure element 260 can have a stand-alone obfuscation engine 270, which can obfuscate data on interconnect 275 and/or interconnect 280 during communications between processor 250 and memory 220. In some cases, the obfuscation engine 270 performs operations similar to when an obfuscation engine is integrated into a processor such as described with respect to obfuscation engine 215 of FIG. 2A. In some cases, the obfuscation engine 270 performs operations similar to when an obfuscation engine is integrated into a memory such as described with respect to obfuscation engine 245.

The obfuscation engine 270 can act as an intermediary between the processor 250 and the memory 220. In some cases, the obfuscation engine 270 receives data at-transit from the processor 250, obfuscates the data at-transit using any one of the obfuscation methods, and then sends the obfuscated data at-transit to the memory 220 (e.g., while keeping track of valid and dummy read requests). In some of such cases, in response to receiving data returned from the memory 220, the obfuscation engine 270 can de-obfuscate the data to return only valid data to the processor 250. In other of such cases, in response to receiving the data returned from the memory 220, the obfuscation engine 270 can send obfuscated data to the processor 250 (e.g., such as described with respect to obfuscation engine 245).

There are several methods for obscuring sensitive data at-transit within a secure element. The objective of the methods is to make it very difficult for an attacker to distinguish between a real transaction of passing sensitive, valid data and a dummy (e.g., fake) transaction that passes dummy data. The difference between the valid transactions and the dummy transactions should be difficult to detect from the outside. For example, the dummy data should have similar characteristics to the valid data in order to make it indistinguishable for an attacker to know the actual events.

Figure 3:
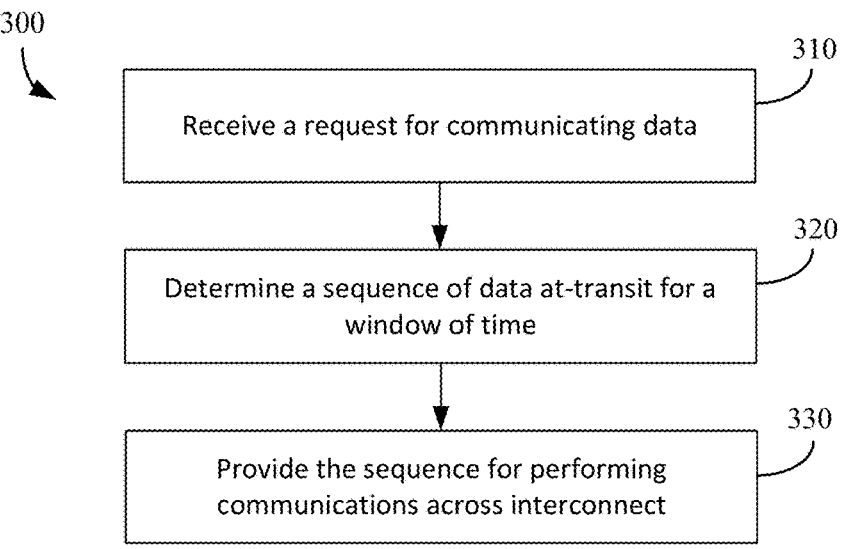
FIG. 3 shows a general process of obfuscating data at-transit.

FIG. 3 shows a general process of obfuscating data at-transit. Referring to FIG. 3, in process 300, an obfuscation engine can receive (310) a request for communicating data. The request can be from any source. In some cases, the request comes from a source outside the secure element. In some cases, the request comes from a processor or other component within the secure element. The request may be a request to read from or write to memory such as described with respect to FIGS. 2A-2C. The obfuscation engine can determine (320) a sequence of data at-transit for a window of time; and provide (330) the sequence of the data at transit for performing communications across interconnect to another component.

A clock signal such as clock 130 of FIG. 1 can provide the timing for the window. For each clock cycle (or other specified number of cycles) of the clock signal, the sequence indicates whether data communicated at that cycle (or specified number of cycles) is to be considered dummy data, valid data, or even a time delay (e.g., null data). The sequence of data at-transit is an indeterminate (e.g., some degree of randomness) sequence. The obfuscation engine may include a random (or pseudorandom) number generator in order to determine the sequence for the data-at transit. Of course, other functions and types of seeds may be used to generate the pattern for the sequence of data at-transit.

The sequence may be stored at the obfuscation engine in a manner that permits the obfuscation engine to keep track of whether valid data, null data, or dummy data is being sent or received across the interconnect, which is useful when the communications across the interconnect are performed. Valid data is considered data that is useable by the system; null data is considered a clock cycle in which no data is in transit and is used in some scenarios where obfuscation includes timing adjustments; dummy data is considered data that can be discarded by the system. In some cases, valid data, null data, and dummy data are used to obfuscate the data in-transit. In some cases, just valid data and dummy data are used to obfuscate the data in-transit. In yet other cases, just valid data is used to obfuscate the data in-transit and the sequence is used to rearrange the valid data out of order. In some implementations, all three types of cases are possible and may occur. In some implementations, the obfuscation engine uses one or two of the cases out of the three as possible for a particular data request/operation.

When providing (330) the sequence for performing communications across interconnect, the obfuscation engine can directly use the sequence to control the data sent across interconnect or can provide the sequence to another component that then uses the sequence to control the data. As mentioned above, the sequence indicates whether the communication is with valid data or dummy data or even whether a pause/null data is performed. The communications following this sequence may be used to transmit partial portions of valid data or used to transmit consecutive data sets. For example, if a standard data set is 32 bits, the 32 bits may be broken up into 8 bit or 16 bit portions that may be interspersed with dummy data and/or pauses. In other cases, if the standard data set is 32 bits, the 32 bits can be transmitted when the sequence indicates that valid data is to be communicated.

In a specific example, such as when the request for communicating data is a read request for data from memory, the memory requests may be performed according to the sequence of the data at-transit. For example, valid read requests may be communicated interspersed with dummy read requests. The memory may only return data from the valid read requests or may return valid data and dummy data according to the sequence/indicator with the read request. When both dummy data and valid data is returned, the sequence can be used to determine which data is valid and which data is dummy data or there may be a flag on the data that indicates whether the data is valid data or dummy data. The valid data can then be provided to the source of the request for further operations.

FIGS. 4A-4G show example timing diagrams for various sequences of data at-transit. FIGS. 4A-4G each show six time slots ($t_1$-$t_6$), representing a window of time (T), for a sequence of data at-transit. The obfuscation engine can determine the sequence for the data at-transit and provide the sequence for performing communications across the interconnect.

Figure 4A:
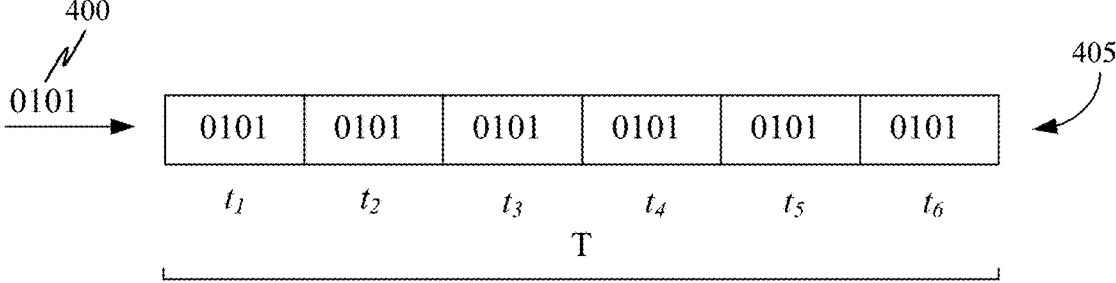
FIGS. 4A-4G show example timing diagrams for various sequences of data at-transit.

As shown in FIG. 4A, 4-bit data 400 of valid data being communicated over interconnect may be '0101'. The obfuscation engine may cause, according to a determined sequence 405, these 4 bits 400 to be transmitted repeatedly for each time slot ($t_1$-$t_6$). This can be referred to as temporal redundancy (e.g., the data is repeated over time). Here, the sequence may be valid data, dummy data, dummy data, dummy data, dummy data, dummy data for the time window T.

Figure 4B:
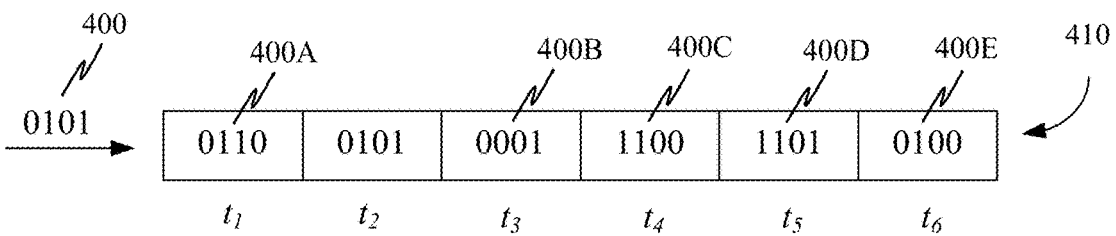

Referring to FIG. 4B, the obfuscation engine can use the data 400 as a seed to generate dummy data (e.g., 400A, 400B, 400C, 400D, 400E) using, for example, a random (or pseudorandom) number generator. The random number generator does not need to be a strong randomness source since the goal is obfuscation and not necessarily complete masking. In the illustrated example, the sequence 410 is dummy data, valid data, dummy data, dummy data, dummy data, dummy data for the time window T.

Figure 4C:
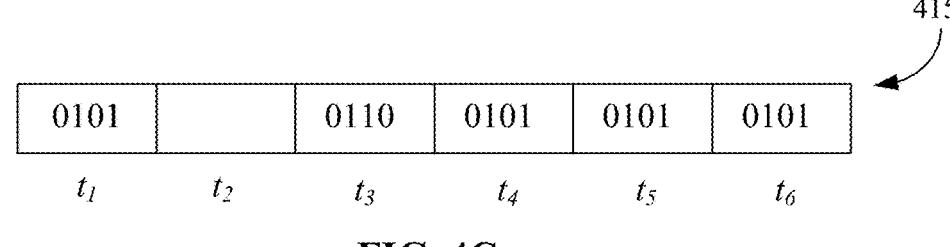

Referring to FIG. 4C, null, or no data, can be sent for a time slot. For example, using the sequence 415, which has valid data, null data, dummy data, valid data, valid data, valid data, a combination of valid, dummy, and null data may be transmitted.

Figures 4D, 4E, 4F:
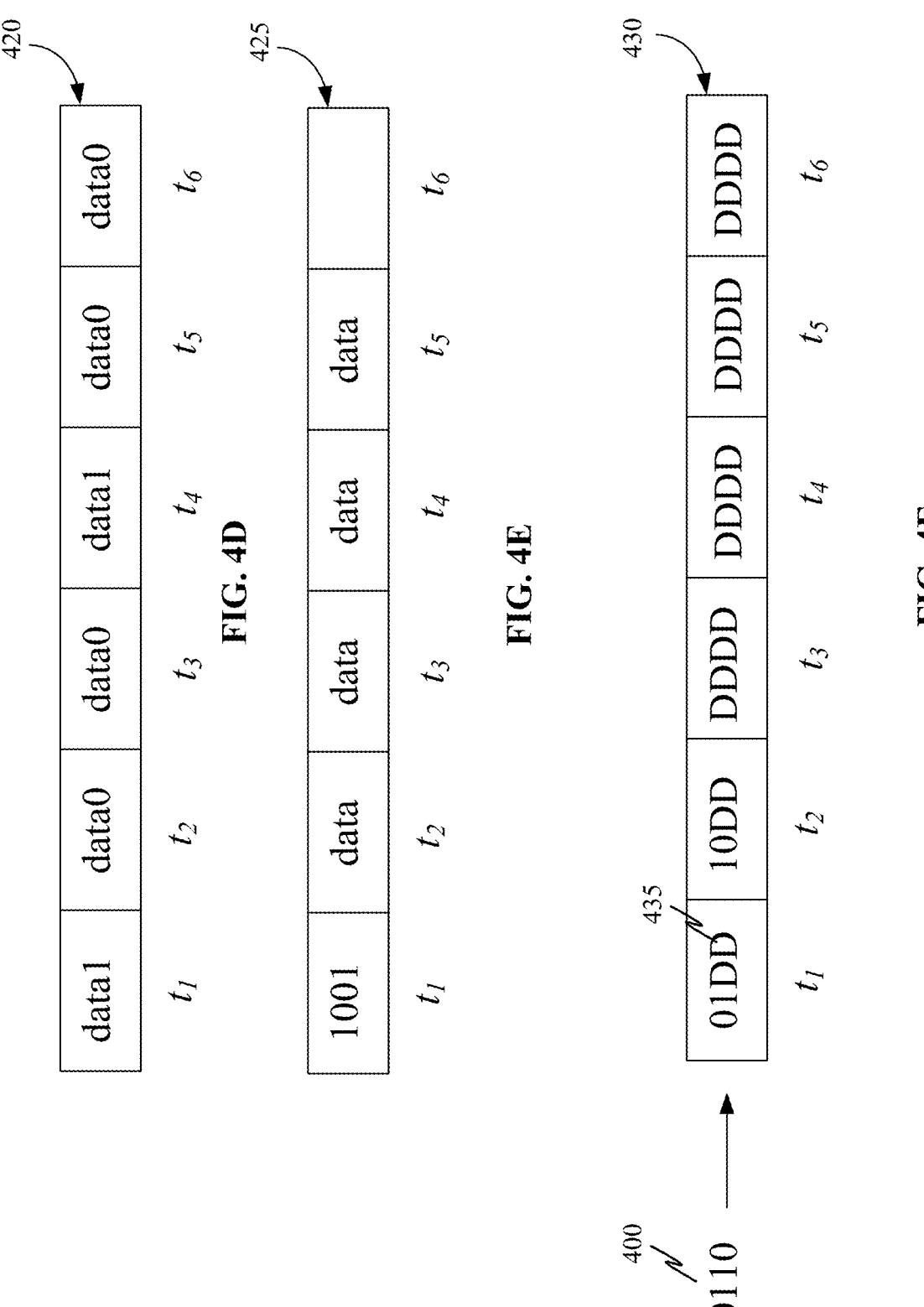

Referring to FIGS. 4D and 4E, in some cases, an indicator may be provided with the data so that the receiving component can understand whether the data is valid data or dummy data. Here, the indicator is a bit. In the illustrated examples a '1' indicates valid data and a '0' indicates dummy data. In FIG. 4D, the bit is transmitted with each data slot according to sequence 420. In FIG. 4E, the bits are transmitted in one of the data slots with sequence 425.

FIG. 4F shows an example timing diagram of a sequence 430 of data at-transit when the format of the data is obscured. In this implementation, the sequence includes an order for partial portions of the valid data within the window of time. For example, the 4-bits of valid data 400 may be separated into 2-bit portions that are to be transmitted in different time slots. Here, time slot $t_1$ contains the first two bits of valid data and two bits of dummy data 435 (each bit denoted as 'D')) and time slot $t_2$ contains the second two bits of valid data and two bits of dummy data. Additionally, dummy data filling an entire time slot may also be included in the sequence, as in $t_3$-$t_6$.

Figure 4G:
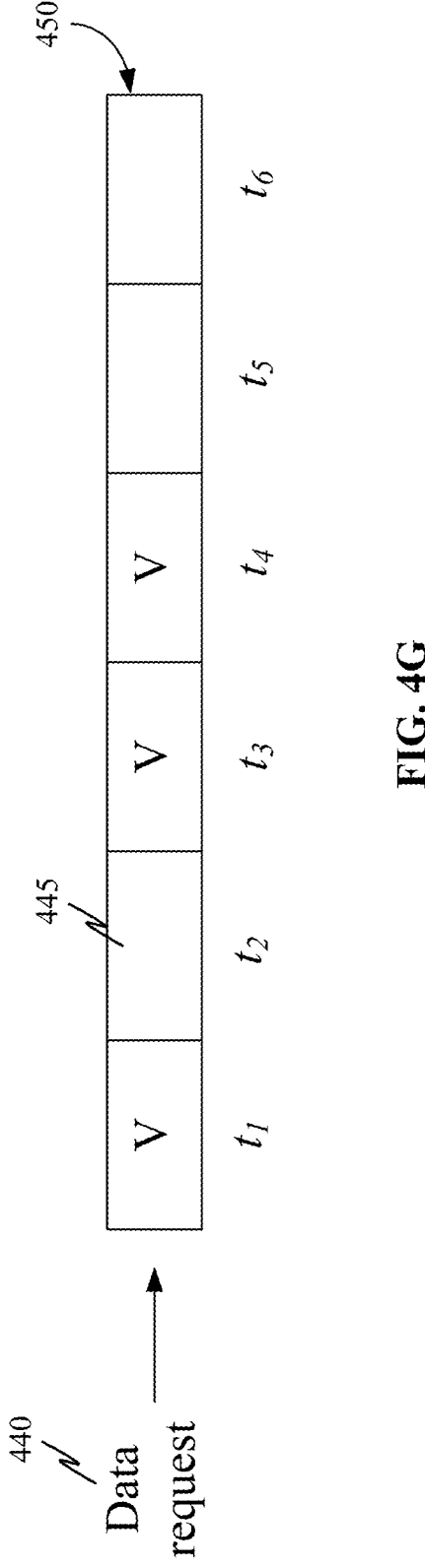

FIG. 4G shows an example timing diagram of a sequence 450 of data at-transit in which extra clock cycles are added at random to create random delays in data transmission. For example, the obfuscation engine may transmit a request for valid data (V) at $t_1$, $t_3$ and $t_4$ and insert extra cycles for null events in time slots $t_2$, $t_5$ and $t_6$. During a null event, no data is transmitted within the secure element.

A method of obscuring data at transit can also use data width modification. Data width modification can be performed at memory or in an engine. The data width of the data from memory can be either smaller or larger than the data width after modification. In the case of the data width after modification being larger than the data width of the data from memory, the valid data can be placed randomly (or pseudorandomly) within the larger width or always placed at the same location within the larger width. For example, if placing the data in the same positions, consider if the data from memory were 0101. If the data width after modification is eight bits, the four-bit sequence could be always at the beginning of the eight bits (0101XXXX), always at the end of the eight bits (XXXX0101), or somewhere in the middle (possibly (XXX0101X). The data after modification that is not the valid data can be bits generated randomly (or pseudorandomly) or have some predefined or generated pattern (or even a repeat of valid data). If data is distributed randomly (or pseudorandomly), the distribution can be based on a predetermined randomized seed to begin a sequence.

In the case of the data width after modification being smaller than the data width of the data from memory, the data could be split up into two or more groups in a variety of ways. The data could be distributed between the groups in a variety of ways, including frontloaded, backloaded, randomly, pseudorandomly, or evenly. If there is more data in total than the data from memory, for instance if six bits of data are sent in four-bit increments, then the remaining data can be any suitable dummy data.

Although the described methods are provided in the context of cryptographic systems, it should be understood that the methods are applicable to other systems in which protection against side channel attacks is desired. Advantageously, certain methods described herein can be implemented using the existing hardware within a cryptographic engine, including, but not limited to, state machines and counters. In some cases, an attack may be identified during operation of the described methods and the computing device can leverage the identification of the attack to increase security by implementing more countermeasures.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for obfuscating data at-transit within an electronic system, the method comprising:

receiving, at a first component on a chip, an instruction request for communicating a first data to a second component on the chip; and obfuscating the first data between the first component and the second component for inhibiting active probing or remote side-channel analysis of the chip by:

determining, by the first component on the chip, a sequence of data arranged to obfuscate the first data while including valid bits of the first data, wherein the sequence of data indicates what is to be conveyed across lines on the chip during each time slot over a window of time controlled by a clock signal on the chip, wherein the window of time is an amount of time given for the second component to receive the first data; and providing, by the first component over the window of time, the first data to the second component across the lines on the chip according to the sequence of data, wherein determining the sequence of data comprises reordering the valid bits of data out of order, and wherein the sequence of data arranged to obfuscate the first data includes only valid bits of the first data.

* * * * *